(12) United States Patent
Rudeen et al.

(10) Patent No.: US 6,273,336 B1
(45) Date of Patent: *Aug. 14, 2001

(54) COLLECTION SYSTEM FOR RANGE ENHANCEMENT

(75) Inventors: Robert W. Rudeen, Eugene; James W. Ring, Blodgett, both of OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,207

(22) Filed: Feb. 10, 2000

Related U.S. Application Data

(63) Continuation of application No. 09/127,399, filed on Jul. 31, 1998, now Pat. No. 6,056,198.
(60) Provisional application No. 60/054,962, filed on Aug. 7, 1997.

(51) Int. Cl.$^7$ ........................................................ G06K 7/14
(52) U.S. Cl. ............................. 235/462.24; 235/462.32; 235/462.35
(58) Field of Search ........................ 235/462.24, 462.32, 235/462.35, 454, 455, 462.23

(56) References Cited

U.S. PATENT DOCUMENTS

| | | | |
|---|---|---|---|
| 4,488,679 | 12/1984 | Bockholt et al. | 235/469 |
| 4,567,361 | * 1/1986 | Rosenthal | 235/462.07 |
| 4,786,798 | 11/1988 | Lonsdale | 250/216 |
| 4,843,222 | 6/1989 | Hochgraf | 235/470 |
| 4,874,933 | 10/1989 | Sanner | 235/470 |
| 5,187,353 | 2/1993 | Metlitsky et al. | 235/462 |
| 5,202,784 | 4/1993 | Reddersen et al. | 359/196 |
| 5,298,727 | 3/1994 | Spratte et al. | 235/462 |
| 5,347,121 | 9/1994 | Rudeen | 250/235 |
| 5,386,105 | 1/1995 | Quinn et al. | 235/462 |
| 5,418,356 | 5/1995 | Takano | 235/462 |
| 5,438,187 | 8/1995 | Reddersen et al. | 235/462 |
| 5,449,892 | 9/1995 | Yamada | 235/462 |
| 5,504,514 | * 4/1996 | Nelson | 347/130 |
| 5,525,810 | 6/1996 | Jewell et al. | 250/566 |
| 5,646,391 | 7/1997 | Forbes et al. | 235/462 |
| 5,754,278 | * 5/1998 | Kurtz | 355/67 |
| 5,786,581 | 7/1998 | Eastman et al. | 235/455 |
| 5,923,021 | 7/1999 | Dvorkis et al. | 235/455 |
| 6,045,045 | 4/2000 | Detwiler | 235/467 |
| 6,056,198 | 5/2000 | Rudeen et al. | 235/462.24 |
| 6,166,375 | * 12/2000 | Ahten | 235/454 |

FOREIGN PATENT DOCUMENTS 3736 288 * 11/1998 (DE) .

OTHER PUBLICATIONS

U.S. application No. 08/942,399, Michael J. Ahten and James W. Ring, filed Oct. 10, 1997, "Offset Optical Axes for Bar Code Scanner.".

* cited by examiner

*Primary Examiner*—Michael G. Lee
*Assistant Examiner*—Diane I. Lee
(74) *Attorney, Agent, or Firm*—Lyon & Lyon LLP

(57) ABSTRACT

A data reading system and method which renders the return signal strength of light reaching the detector more uniform over greater distances and/or positions relative to the collection system and including an optical correction module or corrective optical element(s) is placed in the light collection path to the detector whereby the characteristics of light coming from sources in different locations and/or distances relative to the collection lens may be changed. In one embodiment, an optical element such as a diffusion element or aperture is placed between a collection lens and the detector such that the amount of collected light from a far field target reaching the detector is maximized and the amount of collected light from a near field target reaching the detector is selectively inhibited rendering the total light intensity on the detector more uniform as between the far field signal and the near field signal.

18 Claims, 9 Drawing Sheets

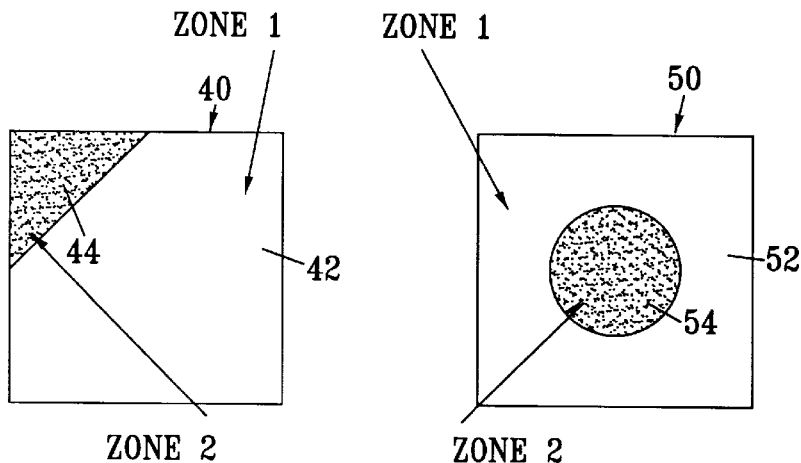
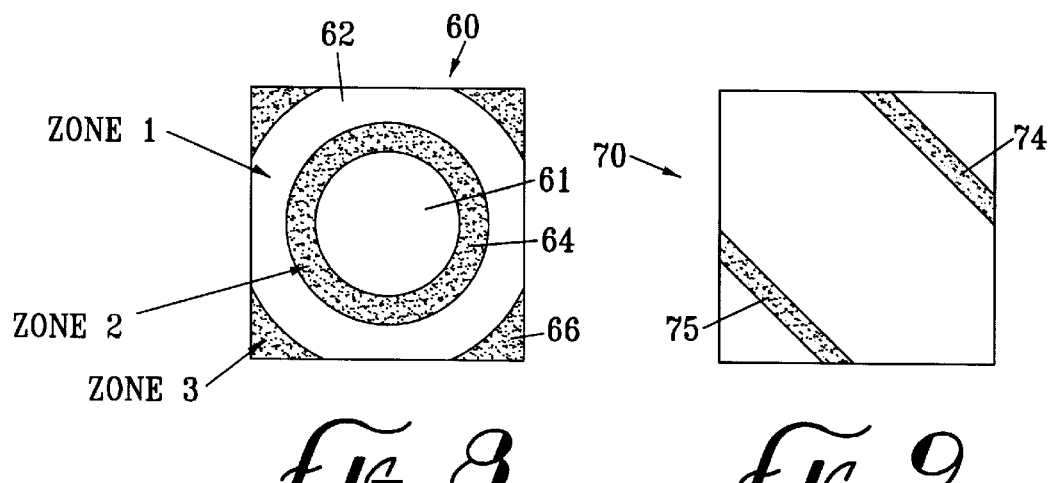

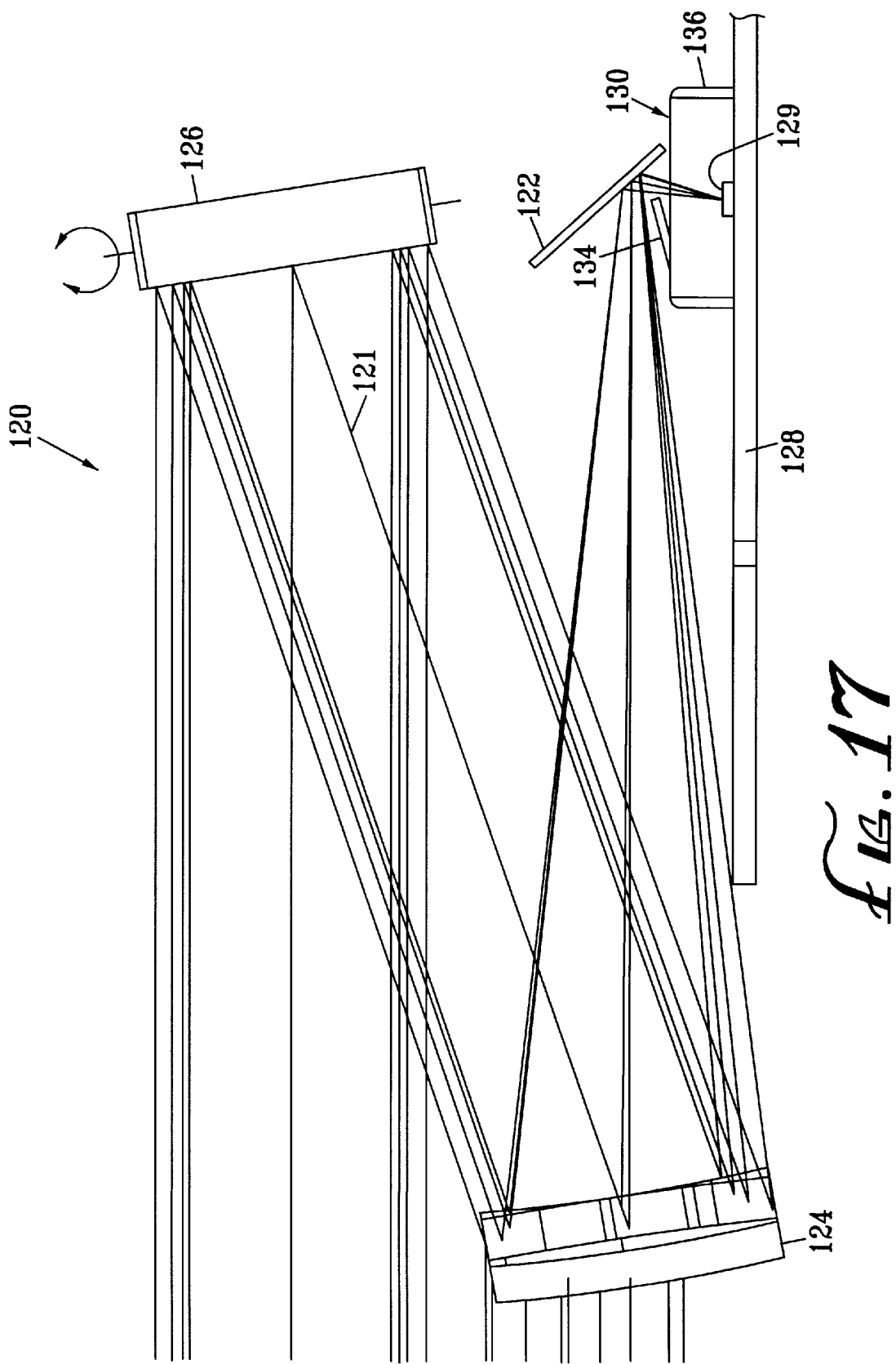

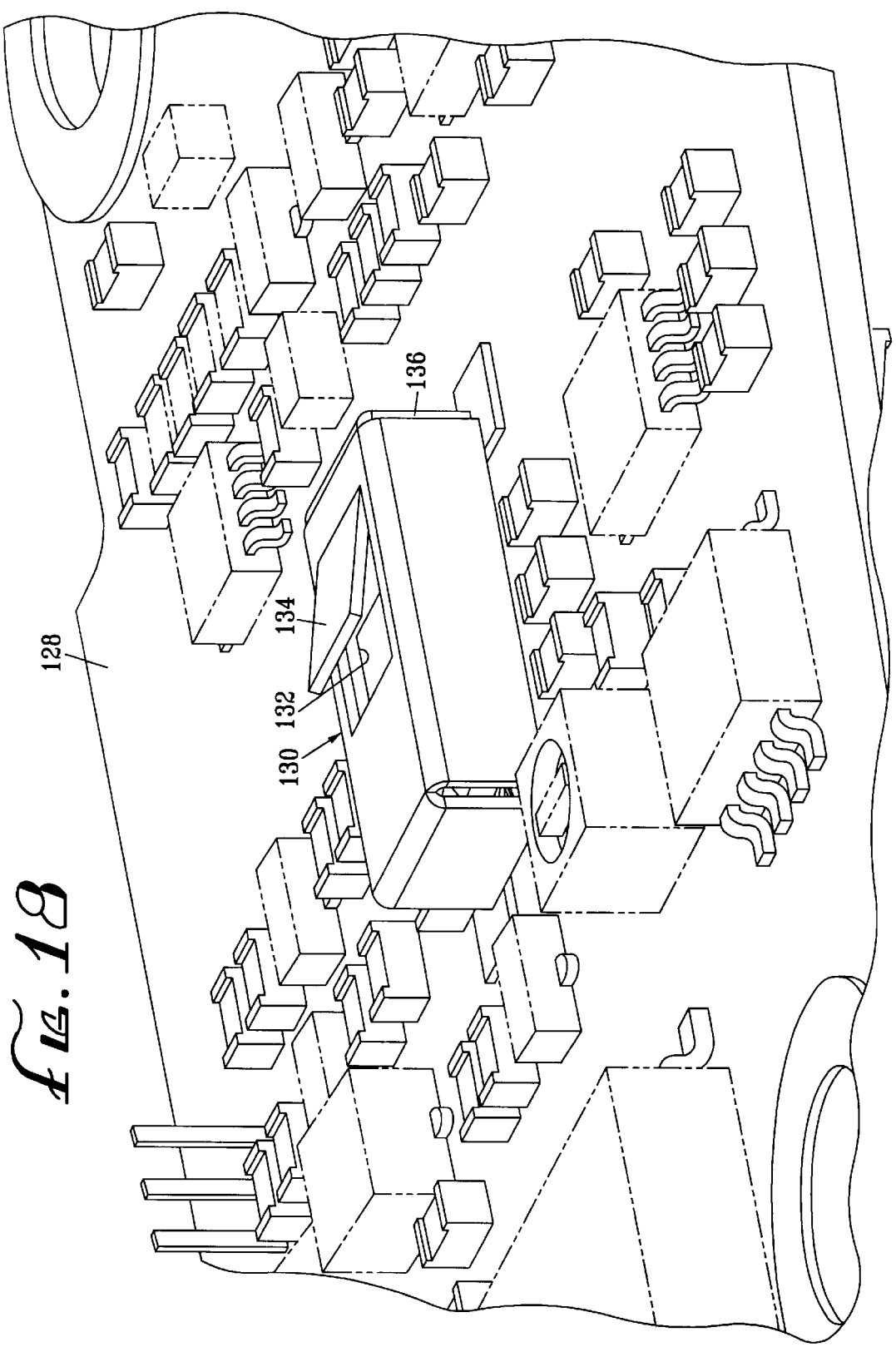

COLLECTION SYSTEM FOR RANGE ENHANCEMENT

RELATED APPLICATION DATA

This application is a continuation of Ser. No. 09/127,399 filed Jul. 31, 1998 U.S. Pat. No. 6,056,198 which is a continuing application of application Ser. No. 60/054,962 filed Aug. 7, 1997.

BACKGROUND OF THE INVENTION

The field of the present invention relates to data reading devices such as for example bar code scanning systems.

In data reading devices, a return light signal from the object or symbol being read is focused onto a detector or detector array. In the example of a bar code scanner reading the bars and spaces of a typical bar code, there needs to be sufficient difference in signal intensity between the signal corresponding to the light space and the signal corresponding to the dark bar in order for the processor to differentiate therebetween. In scanner applications there has been demand for increased depth of field, i.e., the range of distance over which the scanner can effectively scan.

There are several methods for improving depth of field, but there are essentially two areas which may be controlled, namely (1) outgoing beam generation and (2) collection. This application focuses on methods for improving depth of field and signal differentiation from the collection side.

SUMMARY OF THE INVENTION

The present invention is directed to a system and method by which an optical correction module or corrective optical element(s) are placed in the light collection path to the detector in a data reader, whereby the characteristics of light coming from sources in different locations and/or distances relative to the collection lens may be changed, thus rendering the return signal more uniform over greater distances and/or positions relative to the collection system.

In a preferred embodiment, a diffusion element is placed between a collection lens and the detector such that the amount of collected light from a far field target reaching the detector is maximized and the amount of collected light from a near field target reaching the detector is selectively inhibited rendering the total light intensity on the detector more uniform as between the far field signal and the near field signal.

BRIEF DESCRIPTION OF THE DRAWINGS

FIG. 6 is a front view of a third corrective optical element configuration with diffuser zone in an upper corner;

FIG. 7 is a front view of a fourth corrective optical element configuration with diffuser zone in a central circular pattern;

FIG. 8 is a front view of a fifth corrective optical element configuration with concentric rings of diffuser zones;

FIG. 9 is a front view of a sixth corrective optical element configuration with concentric rings of diffuser zones;

FIG. 17 is a side diagrammatic view of another corrective optical system;

FIG. 18 illustrates the corrective optical element of FIG. 17 installed on a printed circuit board.

DESCRIPTION OF PREFERRED AND ALTERNATIVE EMBODIMENTS

Preferred embodiments will now be described with reference to the figures. To facilitate description, any identifying numeral representing an element in one figure will represent the same element in any other figure.

The present inventors have recognized that variation in the collected power of an optical system is a continuing problem for electro-optical systems such as bar code scanners.

One problem is that collected power increases by $1/D^2$ where D is the distance from the source of collected light to the collection aperture. The inventors have determined that it would be advantageous to reduce the dynamic range by reducing this rate of increase.

Figure 2:
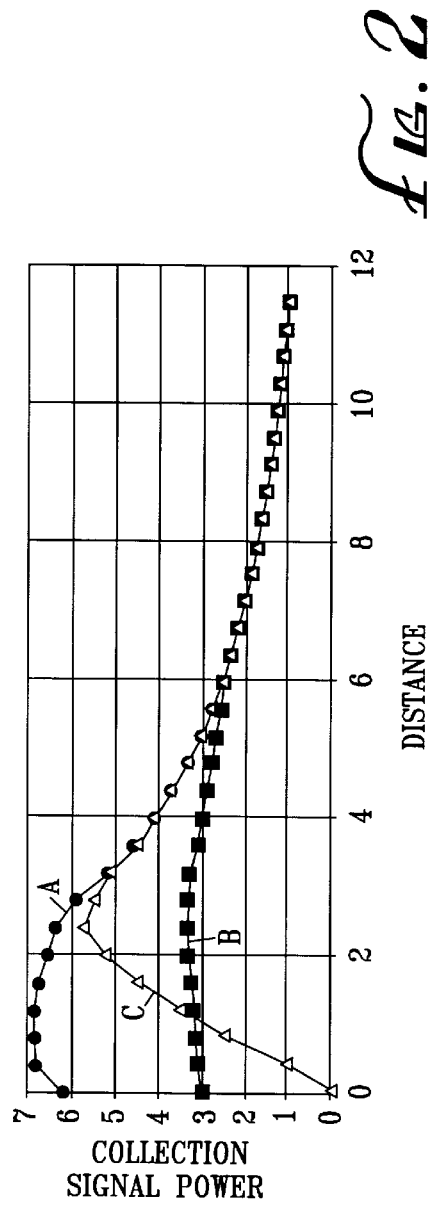
FIG. 2 is a graph of collection signal power curves versus distance from the data reader.

FIG. 2 illustrates graphs of Collection Signal Power versus Distance from the target. As may be seen from Curve A (the nominal signal), collected power increases by $1/D^2$ where D is the distance from the source of collected light to the collection aperture. Therefore at near focal distances, the power of the collection signal can be many times the signal power at remote focal distances. Once detected, the system amplifies the detected signal (i.e. gain) thereby requiring the system to work over a large dynamic range.

Figure 1:
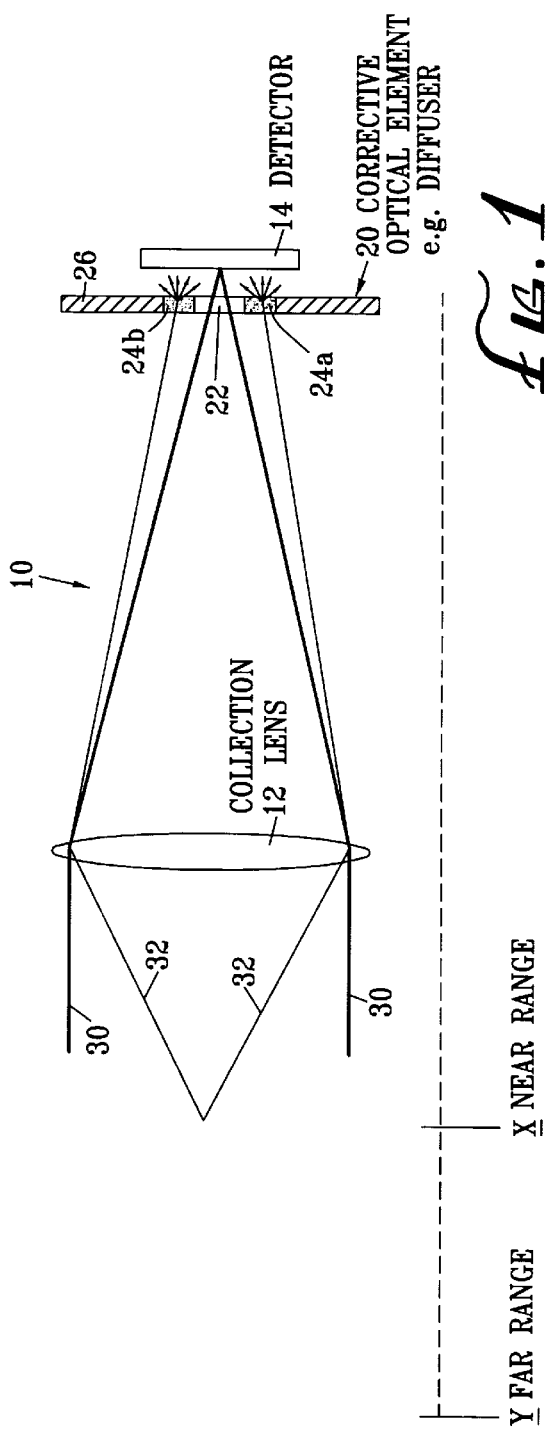
FIG. 1 is a diagrammatic side view (in partial cross section) of a data reader system according to a preferred embodiment.

FIG. 1 illustrates an optical system 10 comprised of a focusing system, in this embodiment shown as collection lens 12, which focuses light reflected/refracted off a target onto a detector 14. Optical module or corrective optical element 20, shown in this embodiment as a single optical element, may comprise for example a diffuser plate disposed between the collection lens 12 and the detector 14. Alternately the focusing system may comprise a collection mirror, collection lens, or other focusing component, or combinations thereof.

The optical element 20 selectively changes one or more characteristics of light coming from targets that are closer to the collection lens 12. The optical element 20 has a central region 22 which may comprise an opening or a clear zone through which light is passed unaffected. Light 30 coming from more distant source (for example at far range Y) is focused to a small spot by lens 12, passing through the central first region 22 without being impacted by the second regions 24a, 24b on the optical element 20. As the target is moved closer to the lens 12, light 32 coming from a nearer source position (for example at near range X) is focused by the lens 12 to some point beyond the detector 14. Thus some portion of the light 32 coming from the near field X falls on the second regions 24a, 24b of the optical element 20. Light passing through the second regions 24a, 24b is not as sharply focused by the lens 12 and is further diffused, diffracted or reflected by the second regions 24a, 24b and as a result the collection power of light from near distance targets is reduced. The optical element 20 may further include a third region 26 comprising a lens, diffuser or other optical region. The third region 26 may alternately be reflective or opaque.

Thus the intensity or amplitude of the light focused by the lens 12 from various locations reaching the detector 14 is made more uniform by passing the light through the corrective optical element positioned between the focusing lens 12 and the detector 14.

In this manner, the shape of the Collection Signal Power versus Distance may be changed as illustrated in Curve B of FIG. 2. The system 10 as in FIG. 1 flattens out the signal return in the near field thereby reducing the dynamic range requirements for the electronics. Gain may be increased without saturation potentially resulting in increased depth of field. If the dynamic signal is too large, the cost of electronics required to process the signal is increased. Signals outside the dynamic range of the electronics will cause saturation or signal distortion.

Figure 3:
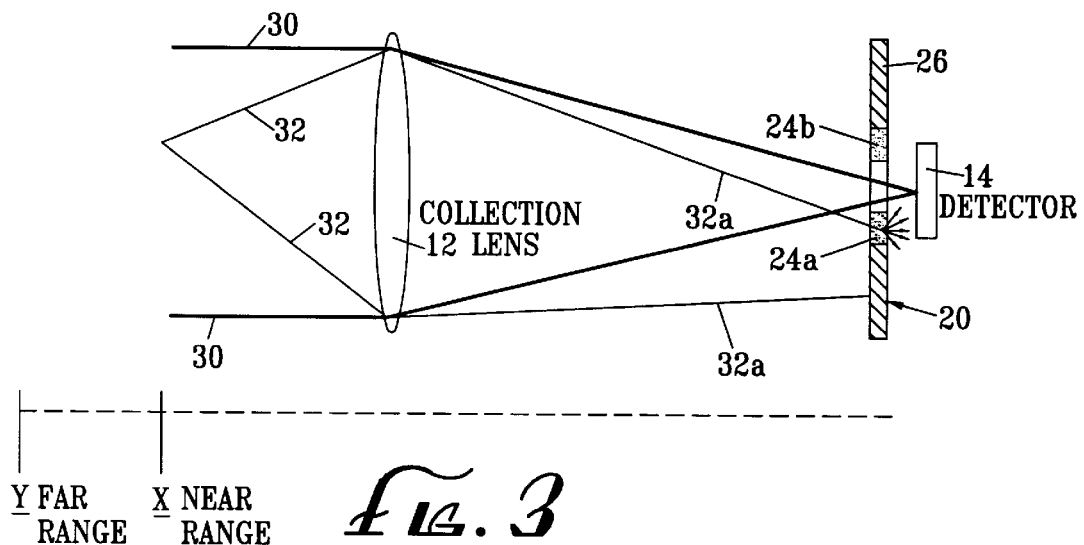
FIG. 3 is a diagrammatic side view of the data reader system of FIG. 1 illustrating how light falling off the detector may be redirected.

The optical element 20 may include several different areas of different properties and surfaces. In some cases, the (return signal) beam will move across the detector 14 as the distance changes. In that situation, non-symmetric regions may be useful. If the mechanical tolerances of the optical system are too large, the beam may move completely off the detector 14. This result will cause Curve A in FIG. 2 to drop to a much lower level in the near field as illustrated by Curve C. FIG. 3 illustrates how light 32 from a near range location X may shift focus position 32a and thereby potentially miss the detector 14. The system 10 compensates via the lower region 24a of the optical element 20 being designed to redirect light 32, that would otherwise be beyond the edge of the detector 14, back onto the detector.

Each region of the optical element 20 may be designed such that the overall collection signal power vs. distance curve matches the needs of the electronics. The regions may be molded, stamped, machined, or made by any other suitable process. The regions may comprises simple diffusers, lenses or more complicated holographic or diffractive elements, or in some instances, reflective or opaque regions such as produced by surface coatings.

Figure 4:
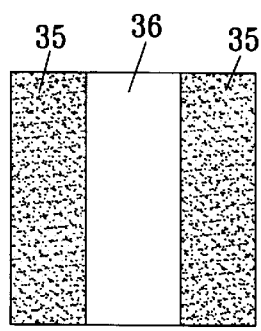
FIG. 4 is a front view of a first corrective optical element configuration with side panel diffuser zones about a rectangular central clear zone.
Figure 5:
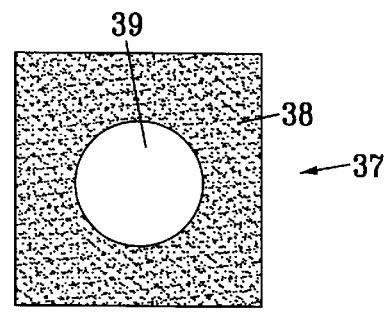
FIG. 5 is a front view of a second corrective optical element configuration with diffuser zone in a outer annular pattern about a central circular clear zone.

The corrective optical element 20 of FIG. 1 may comprise two or more zones, the inner first zone 22 comprising the non-defocusing zone through which the light passes generally unimpeded. The inner first zone 22 may be round, oval, rectangular or any suitable shape. FIG. 4 for example illustrates an optical element 34 having a rectangular first zone 36 centrally positioned between first and second diffuser zones 35. FIG. 5 illustrates another optical element 37 having a central circular first zone 39 surrounded by an outer annular second zone 38.

FIGS. 6–8 illustrate three additional optical element configurations. In the optical element 40 of FIG. 6, the defocusing or diffusing region 44 is essentially triangular and positioned in a corner of the "open" region 42. Positioning the region 42 in the corner comprises an asymmetrical pattern which may be useful for compensating for a tendency of the focused spot of the beam to move relative to the detector depending upon the position and/or distance of the target relative to the collection system. The regions may be simple apertures (or multiple apertures) of various shapes such as round, oval, triangular, square, rectangular, H-shaped or some other suitable shape.

In the optical element 50 of FIG. 7, the defocusing or diffusing region 54 is round and positioned centrally within the "open" region 52. Positioning the region 52 as a circular region in the center comprises a symmetrical pattern.

In the optical element 60 of FIG. 8, the defocusing or diffusing region 64 is a ring-shaped region positioned within a concentric "open" region 62 with a second ring-shaped diffusing region 66 concentrically positioned outside the region 62. The optical element 60 also includes a central round open region 61.

In the optical element 70 of FIG. 9, the optical correction module 70 has defocusing or diffusing regions 74, 75 comprising an asymmetrical pattern of stripes proximate the corners of the module 70.

Figure 10:
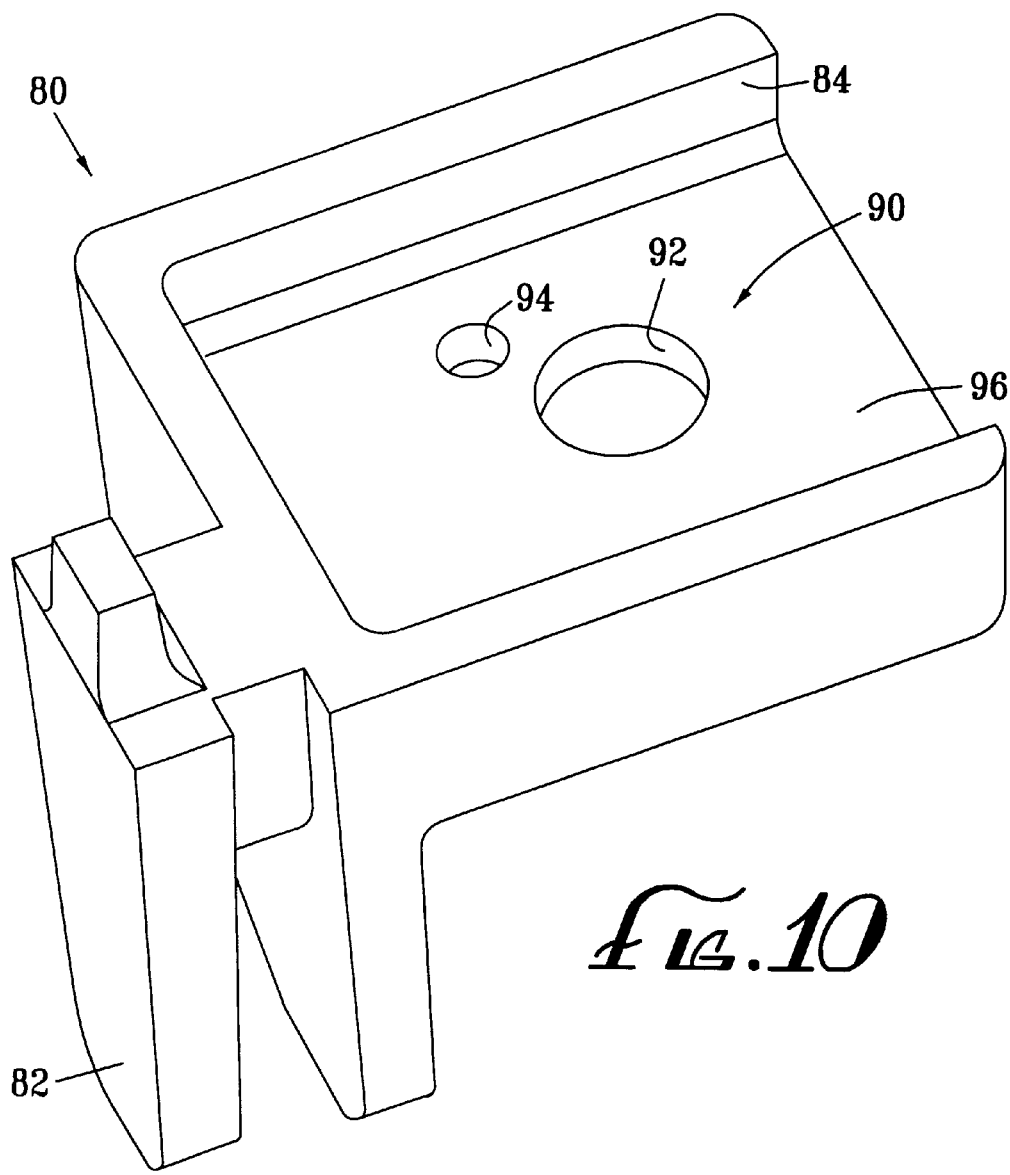
FIG. 10 is a front perspective view of a seventh corrective optical element, formed in a module, the element having two round apertures.
Figure 11:
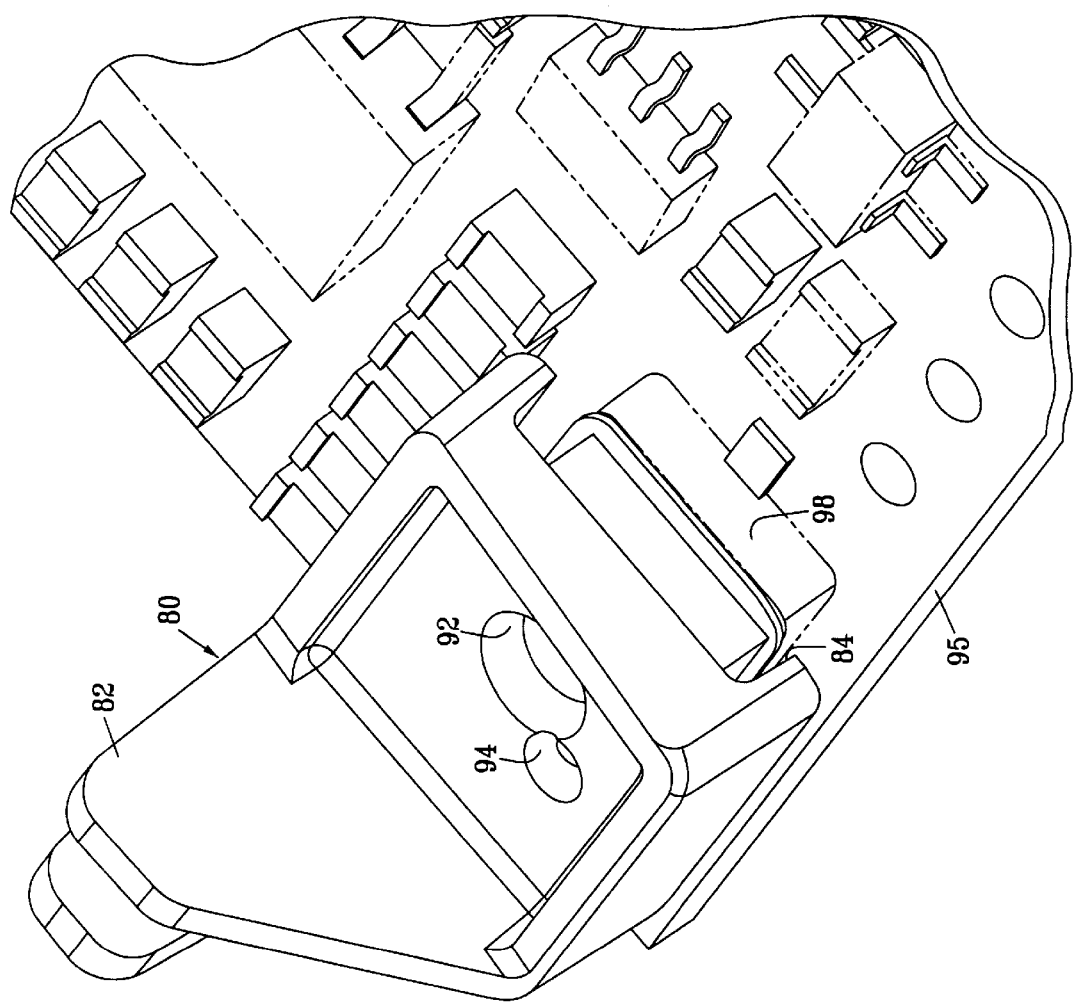
FIG. 11 is a top perspective view of optical element of FIG. 10 disposed over a detector on a printed circuit board.

FIG. 10 illustrates another embodiment for an optical correction element 90 formed together in an optical module 80. The corrective optical element 80 comprises openings 92, 94 in an opaque (e.g. metal or plastic) plate 96. The plate 96 is formed together (in a single piece construction) within a module housing including a mounting bracket 82. As shown in FIG. 11, the module 80 may be positioned over the detector 98 which is mounted to the printed circuit board 95. The module 80 has legs 84 which straddle the detector which may assist in preventing stray light from reaching the detector except as through the apertures 92, 94. The apertures 92, 94 are asymmetrically arranged to provide the desired light distribution onto the detector 98.

The non-transmissive optical regions, which appear shaded in most the figures, may comprise opaque, partially opaque, partially transmissive, partially or wholly reflective region(s), such that the portion of the light impinging in the region is absorbed, deflected, reflected, refracted, diffused or diffracted depending upon the optical properties of the region so as to adjust the amplitude of the light and/or redirect the light reaching the detector. In FIG. 9 for example optical correction module 70 has reflective regions 74, 75 comprising stripes proximate the corners of the module 70. These stripes 74, 75 may comprise bands of lines which are entirely non-transmissive (e.g. opaque or reflective) or partially transmissive. As the distance to the target reduces, the beam spot position (on the detector) may be found to migrate toward one region on the detector, such as the upper right hand corner (as viewed in FIG. 9). As the beam spot migrates, it moves so as to be positioned in greater amount over the stripe 75 thereby resulting a greater portion of beam amplitude prevented from reaching the detector. Therefore as the distance to the object decreases, the amplitude of the reflected/refracted beam from the target increases, but the percentage of the beam reaching the detector is correspondingly decreased.

A suitable optical correction module may be a plastic mask produced by a suitable plastic injection molding supplier made to specifications according to the given application. Alternately, the optical correction module may comprise a stamped or photo-etched metal element placed over or in front of the detector. In a preferred configuration, in an application where a detector includes a conductive shield, the optical correction element may be incorporated into the conductive shield (metal or plastic) of the detector itself. Alternately, the optical correction module may be integrated with the detector such as using photo-lithography to deposit or form the optical correction element directly onto the detector itself.

Alternately, the defocusing regions 24a, 24b (see FIG. 1) may be selectively activatable (for example combined with some sort of range finder or sensor), being activated as needed, cycled on and off, or cycled gradually between on and off to create gray scale therebetween. Examples of activatable regions are the LCD (Liquid Crystal Display) panels described in U.S. Pat. No. 5,347,121 herein incorporated by reference. Multiple panels may be required in the LCD panel example to achieve desired blocking of return light.

In the above embodiments, the optical correction modules were described generally as optical elements with a plurality of zones. Alternately, the optical correction module (i.e. the optical elements) may comprise a plurality separate (or combined) optical elements of different construction. For example the corrective optical element 20 in FIG. 1 may be constructed such that the central region 22 (Zone 1) comprises a glass lens element, the second regions 24a, 24b (Zone 2) comprise a diffuser element, and the third regions 26 (Zone 3) comprise a Diffractive Optical Element (DOE).

FIGS. 12–16 diagrammatically illustrate an image plane system 100 with optical results as predicted by computer simulation using Zemax™ software, an optical design software package commercially available from Focus Software Inc., Tucson, Ariz. USA. System 100 includes a focusing lens 102 focusing reflected and/or returned light, namely laser light scanned across the bar code, through an image plane mask 104 and onto a detector 106.

Figure 12:
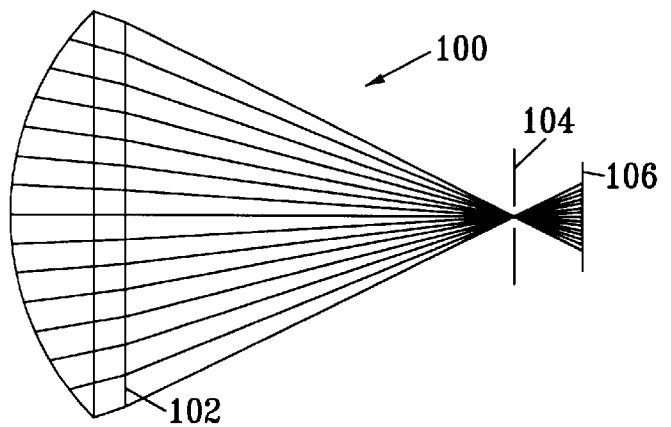
FIG. 12 is a diagram of a spatial aperture collection system according to another embodiment of the present invention illustrating far field focus.

FIG. 12 illustrates collection beam characteristics for a return signal from far field (object at infinity) meaning that the incoming light rays enter the lens 102 parallel to the lens axis. The focusing lens 102 (or multiple lens system) is selected to have a focal length F for light from far field (infinity) to be focused at the image plane mask 104. The image plane mask 104 may be a simple hole or aperture, and this embodiment is selected as a 0.2 mm diameter aperture. The lens 102 has a 10 mm diameter. As predicted by the Zemax™ computer simulation, the incoming light from far field is focused by the lens 102 at the image plane mask 104 passing through the aperture and then onto detector 106. Detector 106 is a 2.6 mm square photo detector. As illustrated, all the light from far field striking the lens 102 is focused by the lens and passed through the image plane mask 104 with all the light reaching the detector 106. Thus this arrangement permits the maximum amount of return light to reach the detector 106 when the object is at far field.

Figure 13:
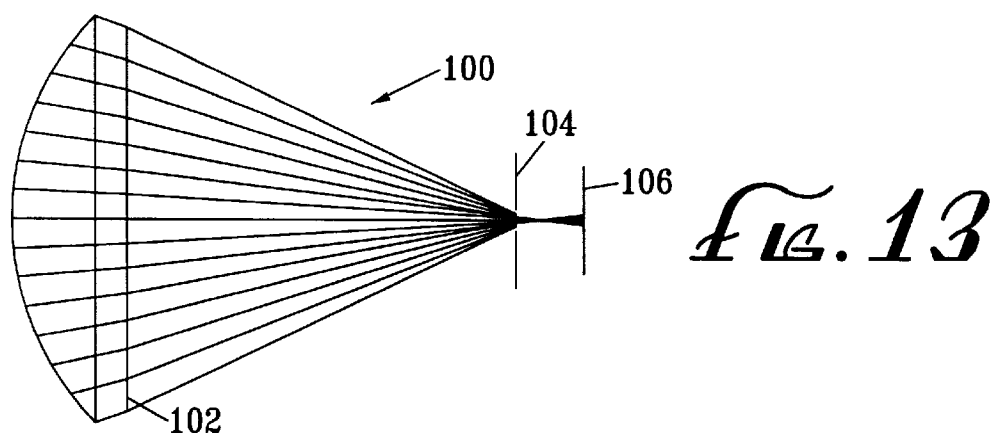
FIG. 13 is a diagram of the spatial aperture collection system of FIG. 12 illustrating near field focus.

FIG. 13 illustrates results for the system 100 for return signal from an object scanned at a near field location. With return light coming from an object placed in the near field, the focal point of light from that object occurs behind the image plane mask. Thus the cone of focused light from the lens 102 (not being at its minimum diameter) is at a larger diameter when it reaches the image plane mask 104. The image plane mask 104 then blocks a portion of the light allowing a smaller portion of light to reach detector 106. Generally, return light from an object in the near field reaches the lens 102 at a higher intensity than light reflected off an object at far field, however as illustrated in FIG. 13, the mask 104 reduces the amount of light reaching the detector 106 from a near field object. Thus the light intensities reaching detector 106 are more equalized between near and far fields as illustrated in FIGS. 12 and 13.

Figure 14:
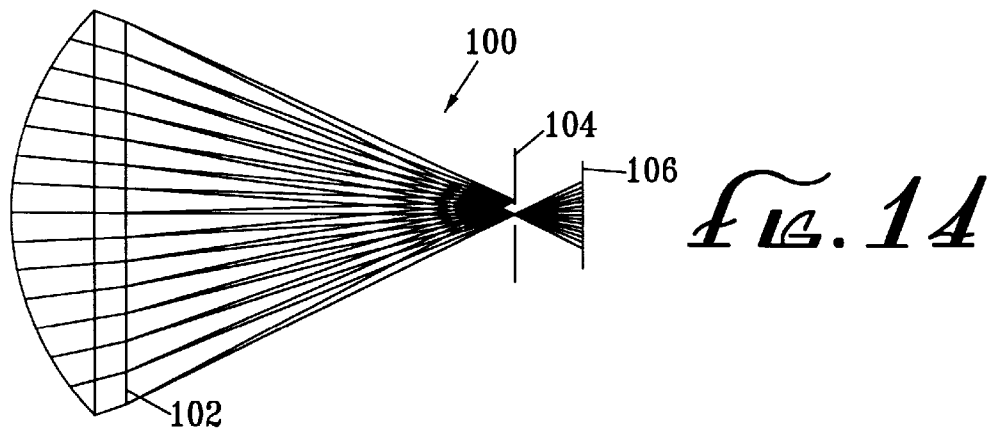
FIG. 14 is a diagram of the spatial aperture collection system of FIGS. 12–13 illustrating off-axis field blocking.

FIG. 14 illustrates the system 100 relative to off-axis light. Similar to FIG. 12, light from far field is focused by the lens 102 passing through the image plane mask 104 and onto the detector 106. Light originating off axis by 2° is focused by the lens 102 to one side of the aperture of the image plane mask 104 and is thus prevented from passing through the aperture and reaching the detector 106. Thus light such as ambient light entering the system from off-axis is inhibited from reaching the detector 106.

Figure 15:
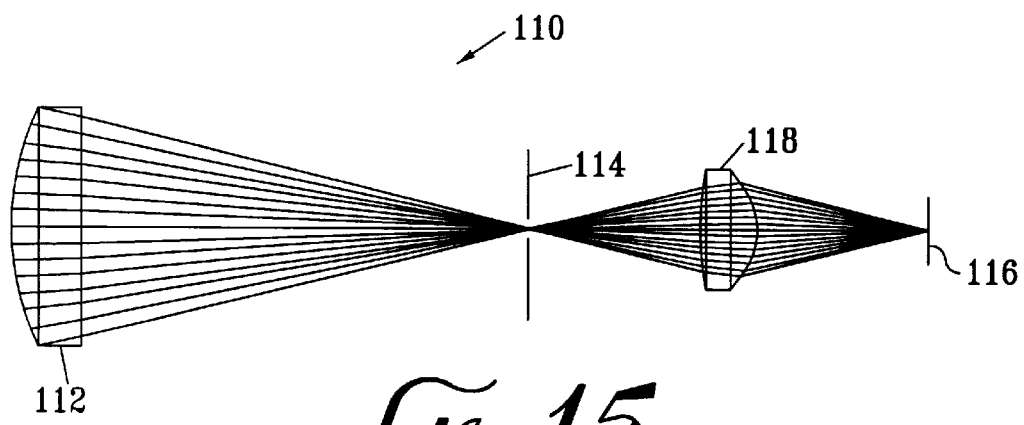
FIG. 15 is a diagram of the spatial aperture collection system of FIG. 12 at far field focus further including a relay lens.
Figure 16:
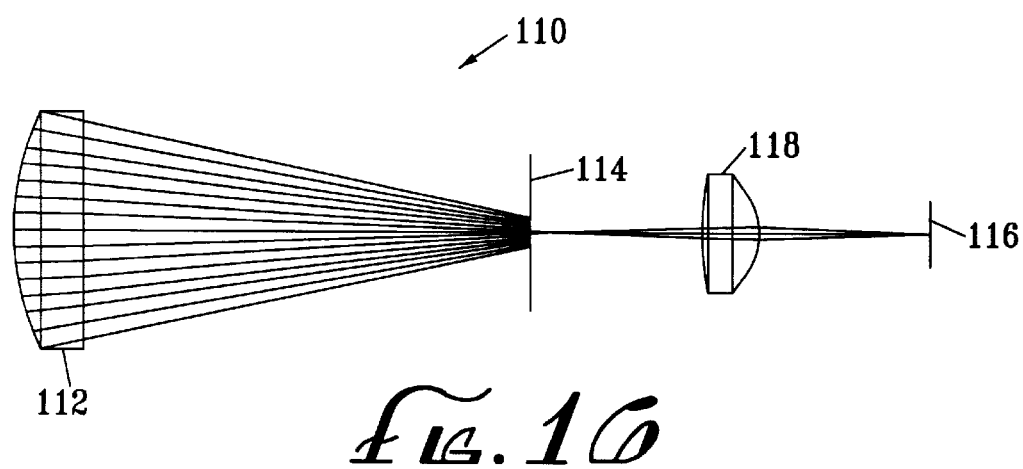
FIG. 16 is a diagram of the spatial aperture collection system of FIG. 15 at near field focus.

FIGS. 15–16 illustrate an alternate embodiment of an image plane mask 110 similar to the system 100 of FIGS. 12–14. In system 110, the focusing lens 112 focuses incoming light through the image plane mask 114, shown in this embodiment as an aperture, and then refocused by relay lens 118 onto a detector. FIG. 15 illustrates beam focusing results as predicted by Zemax™ model for light being reflected off of a target located at far field (infinite distance). Incoming light is focused by the focusing lens 112 so as to focus at the image plane mask 114 such that the light focused by the lens 112 passes through the opening or aperture in the image plane mask 114. Light continues from the image plane mask and is refocused by relay lens 118 onto the detector 116. The system permits use of a small detector and/or a longer length between the image plane mask and the detector 116.

In FIG. 16, light reflected off a near field object is focused by the focusing lens 112 to a distance behind the image plane mask 114. Thus only a portion of the focused light passes through the aperture of the image plane mask 114, such light being refocused by relay lens 118 onto detector 116. Intensity of light from the near field located object is reduced having been cut off by the image plane mask 114.

In these embodiments, masks 104 and 114 are shown as simple aperture masks, however these elements may comprise optical correction modules having one or more regions comprising diffusers, lenses or more complicated holographic or diffractive elements, or in some instances, reflective or opaque regions, or any combination thereof, and having various geometries such as the correction modules described in the above embodiments.

FIGS. 17–18 illustrate another system 120 employing a corrective optical module 130. The system 120 generates an outgoing laser beam 121 which is scanned over a scan angle by a dither mirror 126. Return light reflecting off the target reflects off the scan mirror 126 and is collected by a curved collection mirror 124 onto fold mirror 122 through the optical correction module 130 and onto the detector 129. The detector 129 is mounted on the printed circuit board 128. The optical correction module 130 is disposed over the detector 129 and includes an outer housing 136, a rectangular corrective optical element 132, and a shield 134. The shield 134 inhibits stray light from reaching the detector 129.

Though the present invention has been set forth in the form of its preferred embodiments, it is nevertheless intended that modifications to the disclosed object detection system may be made without departing from inventive concepts set forth herein. The invention therefore is not to be limited except in the spirit of the claims that follow.

What is claimed is:

1. A method of bar code scanning comprising the steps of:
   sending out an outgoing light beam focused to a given waist location;
   reflecting light off a target;

focusing the light reflected off the target with a focusing system;

directing focused light toward a detector;

making intensity of the reflected light from various locations reaching the detector more uniform by passing the light through a corrective optical element positioned between the focusing system and the detector.

2. A method according to claim 1 further comprising passing the light through the corrective optical element with a minimum quantity of reflected light from far field being prevented from reaching the detector by the corrective optical element.

3. A method according to claim 1 wherein the focusing system comprises a collection mirror.

4. A method according to claim 1 further comprising the steps of focusing reflected light from near range with the lens toward the corrective optical element and preventing a portion of the reflected light from near range from reaching the detector by means of the corrective optical element.

5. A method according to claim 1 wherein the step of making intensity of the reflected light from various locations reaching the detector more uniform comprises diffusing portions of the reflected light via the corrective optical element.

6. A method according to claim 1 wherein the step of making intensity of the reflected light from various locations reaching the detector more uniform comprises compensating for migration of reflected light across or off the detector depending upon location of the target.

7. A method according to claim 1 wherein the corrective optical element comprises an aperture.

8. A method according to claim 1 wherein the corrective optical element comprises a plurality of apertures.

9. An optical system for data reading comprising a light source directing an optical beam along an outgoing path toward an object;

a detector positioned to receive light reflected from the object;

a focusing system for focusing return light from the object along a return path toward the detector;

a corrective optical element disposed in the return path between focusing system and the detector for making intensity of reflected light from different locations reaching the detector more uniform.

10. An optical system according to claim 9 wherein the corrective optical element comprises a non-symmetrically positioned aperture.

11. An optical system according to claim 9 wherein the corrective optical element is constructed and arranged to prevent only a minimum quantity of reflected light from far range from reaching the detector.

12. An optical system according to claim 9 wherein the corrective optical element is constructed and arranged to prevent a portion of reflected light from near range from reaching the detector.

13. An optical system according to claim 9 wherein the focusing system comprises a collection mirror.

14. An optical system according to claim 9 wherein the corrective optical element includes an aperture and the collection system comprises a focusing lens element.

15. An optical system according to claim 9 wherein the corrective optical element comprises light diffusing regions.

16. An optical system according to claim 9 wherein the corrective optical element compensates for migration of reflected light across or off the detector depending upon location of the target.

17. An optical system according to claim 9 wherein the corrective optical element comprises a round aperture.

18. An optical system according to claim 9 wherein the corrective optical element comprises a plurality of apertures.

* * * * *